Feb. 25, 1947.    E. G. HOLLENBECK    2,416,481
ANIMAL TRAP
Filed May 29, 1944
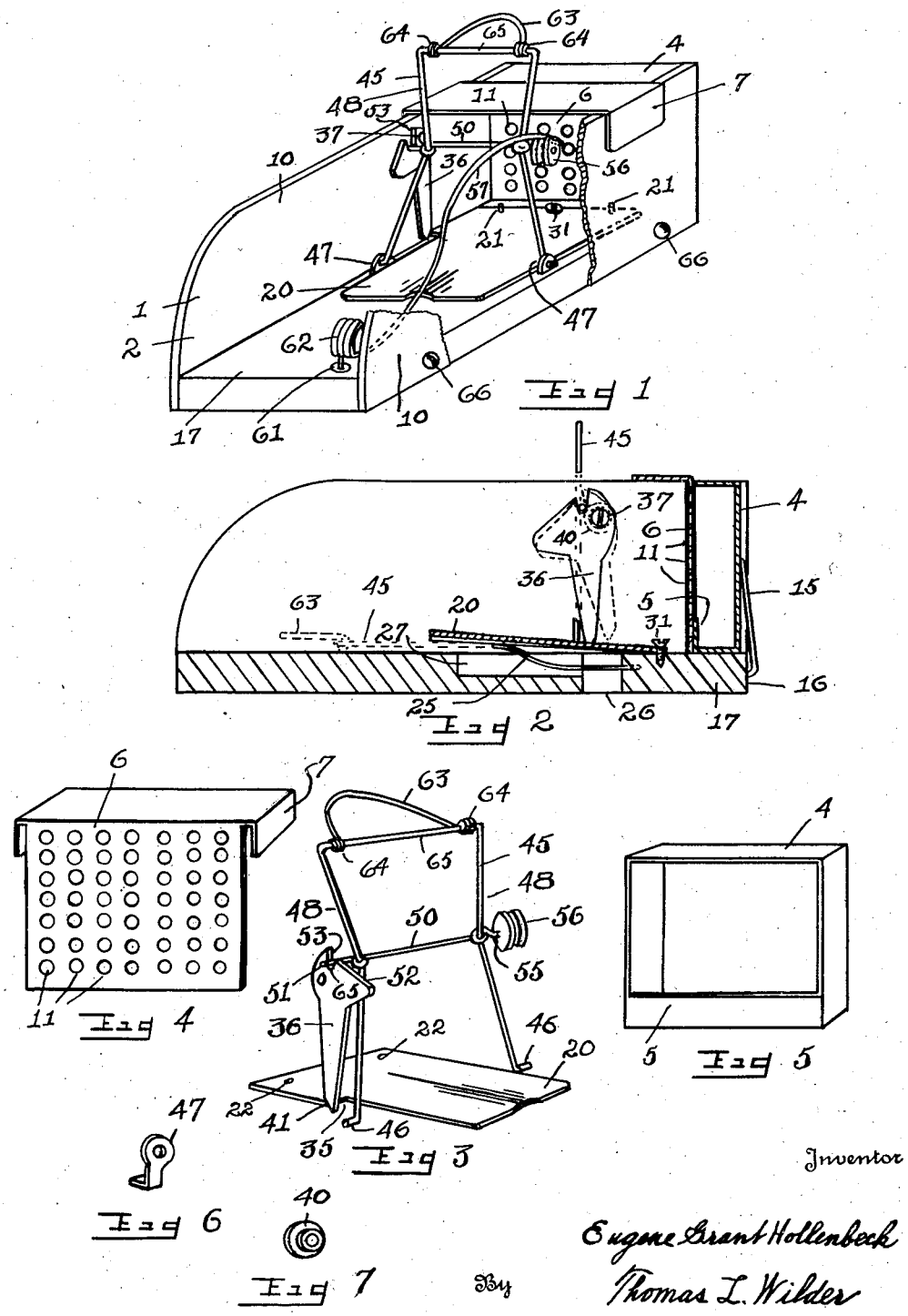

Patented Feb. 25, 1947

2,416,481

UNITED STATES PATENT OFFICE 2,416,481

ANIMAL TRAP

Eugene Grant Hollenbeck, Utica, N. Y.

Application May 29, 1944, Serial No. 537,925

4 Claims. (Cl. 43—81)

My invention relates to an animal trap and I declare the following to be a full, clear, concise and exact description thereof sufficient to enable anyone skilled in the art to which it appertains to make and use the same, reference being had to the accompanying drawings in which like characters refer to like parts throughout the specification.

The object of the invention is to provide an animal trap that can be baited permanently and can be set in open position with very little effort on the part of the user. The object will be understood by referring to the drawings in which;

Fig. 1 is a perspective view of the trap, showing parts broken away for clearness.

Fig. 2 is a view showing a central vertical section of the trap.

Fig. 3 is a perspective view, showing the trap mechanism employed in the device and parts immediately connected thereto.

Fig. 4 is a detail view showing a perspective of a grating and immediate parts employed, and looking at the rear side thereof.

Fig. 5 is a detail view showing a perspective of a bait chamber employed in the device.

Fig. 6 is a detail view enlarged showing a perspective view of a bearing member employed.

Fig. 7 is a detail view, somewhat enlarged, showing a perspective of a spacing washer employed in the device.

Referring more particularly to the drawings, the trap embodies a casing 1 forming a death chamber 2 that is open at its top and end parts. One end is closed by a removable bait container 4, which is of box shape, for the storage of the bait which is usually old cheese or rinds, the waste from the dining table. The front face of the bait container is open nearly its entire extent, excepting a narrow bait retaining member 5 at the bottom portion. The open front surface of bait container 4 is closed by a grating 6 made as a separate part and slid down in front of the container 4 from the top of casing 1 into open grooves formed in opposite sides 10, 10 of casing 1 and on the inner surfaces thereof. It has an overhanging part 7. Numerous apertures 11 made in grating 6 will allow the odor of the bait to escape, whereby mice or rodents can smell the bait but not eat thereof. The older the pieces of cheese or rinds used, the better service will be performed thereby because of the strong odor and hence attraction for the mice. Furthermore, the bait will last indefinitely for, as stated above, the mice can not reach it.

Container 4 fits substantially flush with the inner sides 10, 10 of casing 1 and is disposed at the end thereof. It is held in place against grating 6 by a V-shaped spring member 15 which has its ends driven at right angles into the end part 16 of base member 17. The upper free end of spring 15 will press against the back surface of container 4, whereby to hold it snugly against grating 6.

The tread or releasing plate 20 is mounted on base member 17 and is held in position thereon by two upstanding pins 21, 21 that project upward through two corresponding loose apertures 22, 22 made in plate 20, whereby to allow plate 20 to rock or swing upward at an angle to the surface of base member 17.

The means for forcing plate 20 upward at an angle to base 17 contemplates a flat spring 25 that has one end forced with a tight fit into base 17 at the location of hole 26 which extends through base 17 to allow for the escape of dirt. Hole 26 communicates with a channel 27 made also in base 17 and large enough to accommodate the length of flat spring 25 when it is forced downward therein by the weight of an animal stepping on plate 20.

The means for adjusting the degree to which plate 20 can rise at an angle to base 17 contemplates a screw 31 mounted in a threaded aperture in base 17. It projects through a loose aperture in plate 20. Turning screw 31 downwards will reduce the degree to which plate 20 can be swung upward, and likewise turning screw 31 upward will increase the degree. Screw 31 also holds plate 20 to pins 21.

Furthermore, plate 20 has a shoulder formed at 35 by cutting away a portion of the lateral side of plate 20, which shoulder 35 is engaged by the lower end of a trip lever 36 hereinafter mentioned. Trip lever 36 is mounted eccentrically to swing on pivot screw 37. Screw 37 in turn is mounted in the lateral surface of the one of the sides 10 of casing 1. A spacing washer 40 is used in the mounting and holds trip lever 36 from contacting the surface of side 10. The lower part of trip lever 36 is beveled at 41 where it engages shoulder 35 of tread plate 20, whereby to effect a very sensitive contact therewith, so that the least jar will spring the trap.

The means for swinging trip lever 36 into engaging position with the shoulder 35 of plate 20 anticipates a jaw or striker frame 45 preferably made of wire. Its lower free ends 46, 46 are fulcrumed in bearings in upstanding members 47, 47 which are sunk in base 17 and bent at right angles to fit flush with the lower surface of base 17.

The lateral sides 48, 48 of striker frame 45 converge slightly and are tied together by a cross wire 50 that is wound about sides 48, 48 at substantially the center thereof with its respective ends extending beyond sides 48, 48. One of said projecting ends 51 serves as a latch bar and engages the cam surface 52 of pawl or trip lever 36 and riding up thereon makes contact with the edge 53 of cam 52, whereby to rock trip lever 36 into full line or trap setting position illustrated in Figs. 1, 2 and 3.

The opposite projecting end 55 of cross wire 50 serves as an axle for mounting the grooved pulley 56 which turns thereon and is held in place by the contiguous surface of side 10 of casing 1. A long S-shaped wire spring 57 is used to snap the striker frame closed. One end thereof is held with a tight fit in a socket 61 sunk into base 17. Spring 57 commences to curve downward at about its center portion and gradually increases its curvature from the center portion to the coiled spring end 62 where it fits into socket 61.

The location of spring 57 with its coil 62 in the front part of the casing 1 allows all the back part thereof to be used as a bait chamber. Moreover, when striker frame 45 is raised to the full line position illustrated in Figs. 1, 2, and 3, the free end of spring 57 is raised also to thereby increase the pressure upon pulley 56 carried by striker frame 45. When striker frame 45 stands in vertical position illustrated in Figs. 1, 2 and 3 the pressure of spring 57 will be offset by the engagement of lever 36 with the shoulder 35 of plate 20. However, in this open or set position of the striker frame 45 the downward pressure of spring 57 on pulley 56 falls back of the center of gravity of striker frame 45 whereby said striker frame 45 will be forced forward and downward when the trap is sprung by pressure of the mouse on the raised end of plate 20. Furthermore, the pressure of spring 57 will increase very rapidly as the striker frame 45 falls reaching its maximum force when it approaches the base 17 of the trap and, therefore, is very effective in killing any animal in the trap. Striker frame 45 with cross bar 50 presents sufficient surface to kill any animal that gets within the casing 1.

The operation of the trap is effected by first supplying bait to chamber 4. This can be done by elevating grating 6 and then lifting out chamber 4 for packing with the bait consisting of old cheese or old rinds. Once baited, it will not be necessary to repeat except at long intervals of time. In replacing chamber 4, it will be found more convenient to replace grating 6 first and then slip container 4 into place between grating 6 and spring 15, which will hold it in place.

In order to set the striker frame 45, the operator will grasp casing 1 with one hand and bail 63 of striker frame 45 with the other and pull upwards on bail 63. As striker frame 45 nears its upper position, latch bar or projecting end 51 will ride up cam surface 52 of trip lever 36 and strike against edge 53 thereof, whereby to swing trip lever 36 into full line position illustrated in Figs. 2 and 3. Latch 51 will come to rest in recess 65 of trip lever 36, whereas the lowered beveled part 41 of lever 36 will rest against shoulder 35 of plate 20. As the lower end of trip lever 36 moves forward over plate 20 and past shoulder 35 thereof, flat spring 25 will force plate 20 to rock upward in the position illustrated in Figs. 1, 2 and 3 to allow the beveled part 41 of lever 36 to engage shoulder 35 of plate 20, in which position the parts are in cocked or set position.

If a mouse should now enter casing 1, drawn by the scent of the cheese, and step on plate 20, it will be rocked downward to disengage trip lever 36 from shoulder 35 of plate 20, whereupon trip lever 36 will rock into dotted line position illustrated in Fig. 2 and permit latch 51 to move out of recess 65 of trip lever 36. Thereafter striker frame 45 will swing downward under pressure of spring 57, thereby striking and killing the mouse or other animal in the trap therebeneath.

When resetting the trap the like operations will be repeated.

It will be observed that the tread plate 20 has a slight crease lengthwise through the center thereof to aid in making it more rigid. Moreover, the ends 64, 64 of bail 63 are wound about the upper horizontal bar 65 of striker frame 45, whereby to allow said bail 63 to swivel thereon.

Side plates 10, 10 are held to base 17 by screws 66, 66.

Having thus described my invention, what I claim as new and desire to secure by Letters Patent is as follows:

1. In an animal trap, a casing, a bait chamber disposed in said casing, a trip lever having a cam surface and edge formed thereon, a striker frame having a laterally projecting extension for engaging said cam surface and edge of the trip lever, a tread plate having a shoulder for engaging the said trip lever, whereby to hold the striker frame in cocked position, spring means for actuating said striker frame, and a bail attached to said striker frame for manually moving said striker frame to cocked position.

2. In an animal trap, a casing having sides and a bait chamber, a trip lever pivotally mounted on one of the sides of said casing and having a cam surface and edge formed thereon, a striker frame having a projecting end adapted to engage the cam surface and edge of said trip lever, a plate having a shoulder for engaging said trip lever, spring means for forcing said striker frame to closed position, and a bail attached to said striker frame for actuating said striker frame to cocked position.

3. In an animal trap, a casing having side members and an open front part, a bait chamber formed in said casing, a slide grating for closing said bait chamber, a pivotally mounted trip lever, a striker frame having a projecting end for engaging said trip lever, whereby to hold said trip lever in cocked position, a spring pressed tread plate having a shoulder for engaging said trip lever, whereby the actuation of the plate will release said lever for tripping and release said striker frame for killing a rodent, a spring engaging said striker frame for actuating it to closed position, and a bail attached on said striker frame for manually actuating it to cocked position.

4. In an animal trap, a casing having lateral sides and an open front part, a bait chamber formed in said casing, a slide grating having an overhanging part for closing said bait chamber, a pivotally mounted trip lever having a cam surface terminating in a recess and an edge formed thereon, a striker frame pivotally mounted on said casing and having a projecting end for engaging the recess in said trip lever, a spring pressed tread plate having a shoulder for engaging said trip lever, whereby the actuation of said plate will release said trip lever and said striker frame for killing a rodent, a spring having one end engaging said casing and the other end engaging said striker frame for actuating said frame to closed position for killing a rodent, a bail attached to said striker frame for manually moving it to cocked position, and a screw mounted in said casing and engaging said tread plate for controlling the movement of said plate relative to said casing.

EUGENE GRANT HOLLENBECK.

REFERENCES CITED

The following references are of record in the file of this patent:

UNITED STATES PATENTS

| Number | Name | Date |
| --- | --- | --- |
| 1,248,944 | Stilson | Dec. 4, 1917 |
| 70,134 | Trevitt | Oct. 22, 1867 |
| 1,184,558 | Morton | May 23, 1916 |
| 726,350 | Robinson | Apr. 28, 1903 |
| 636,901 | Johnson | Nov. 14, 1899 |